United States Patent
Yun et al.

(10) Patent No.: US 7,193,761 B2
(45) Date of Patent: Mar. 20, 2007

(54) METHOD OF CONTROLLING BEAM SCANNING TIMING AND BEAM ENERGY AND LIGHT BEAM SCANNING APPARATUS USING THE SAME

(75) Inventors: Sang Kyeong Yun, Kyunggi-do (KR);
In-Jae Yeo, Kyunggi-do (KR);
Kyu-Bum Han, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 288 days.

(21) Appl. No.: 10/952,244

(22) Filed: Sep. 28, 2004

(65) Prior Publication Data

US 2005/0269492 A1   Dec. 8, 2005

(30) Foreign Application Priority Data

Jun. 7, 2004   (KR) .................... 10-2004-0041428

(51) Int. Cl.
*G02B 26/08* (2006.01)
(52) U.S. Cl. .................... 359/216; 359/205; 359/212; 359/226; 359/900
(58) Field of Classification Search .................... None
See application file for complete search history.

(56) References Cited

U.S. PATENT DOCUMENTS 5,053,619 A * 10/1991 Arimoto .................... 250/235

6,898,377 B1 * 5/2005 LeHoty et al. ................ 398/87

FOREIGN PATENT DOCUMENTS

| JP | 54-087014 | 11/1979 |
|----|-----------|---------|
| JP | 60-219866 | 2/1985 |
| JP | 62-032769 | 2/1987 |
| JP | 64-028667 | 1/1989 |
| JP | 04-141617 | 5/1992 |

* cited by examiner

*Primary Examiner*—James Phan
(74) *Attorney, Agent, or Firm*—Christensen O'Connor Johnson Kindness PLLC

(57) ABSTRACT

Disclosed herein is a method of controlling beam scanning timing and beam energy and a light beam scanning apparatus using the method. The light beam scanning apparatus includes a beam generation and processing means, a calculation and control means, a diffraction and scanning means and a scanning and processing means. The beam generation and processing means generates a beam and converts the beam into collimated light. The calculation and control means calculates scanning periods and beam energy, controls the operation periods and diffraction amounts of pixels of a light modulator. The diffraction and scanning means diffracts and modulates the beam and scans a plurality of diffracted beams.

22 Claims, 5 Drawing Sheets

Start → Set initial θ value ~S501 → Calculate linear beam velocity ~S502 → Calculate Δt ~S503 → Rotation angle value Δθ ~S504 → Update initial θ value ~S505

METHOD OF CONTROLLING BEAM SCANNING TIMING AND BEAM ENERGY AND LIGHT BEAM SCANNING APPARATUS USING THE SAME

BACKGROUND OF THE INVENTION

1. Field of the Invention

The present invention relates generally to a method of controlling beam scanning timing and beam energy and a light beam scanning apparatus using the method and, more particularly, to a method of automatically controlling refracted beam scanning timing and beam energy and a light beam scanning apparatus using the method.

2. Description of the Related Art

In general, optical signal processing has the advantages of high-speed processing, parallel processing and high-capacity processing capabilities, unlike conventional digital information processing that cannot process a large amount of data in real time. Research on the design and manufacture of a binary phase only filter, an optical logic gate, an optical amplifier, an image processing technique, an optical element and a light modulator is carried out using a spatial light modulation theory. The light modulator is applied to the fields of optical memory, an optical display, a printer, an optical interconnection and a hologram, and the research and development of a light beam scanning apparatus using the light modulator is being conducted.

Such a light beam scanning apparatus functions to produce an image by scanning a light beam and spotting the light beam on a light-sensitive medium in an image production apparatus, such as a laser printer, a Light Emitting Diode (LED) printer, an electrophotographic copier or a word processor.

Recently, with the development of a projection television, such a light beam scanning apparatus is being used as a means for scanning a beam onto an image display.

Figure 1:
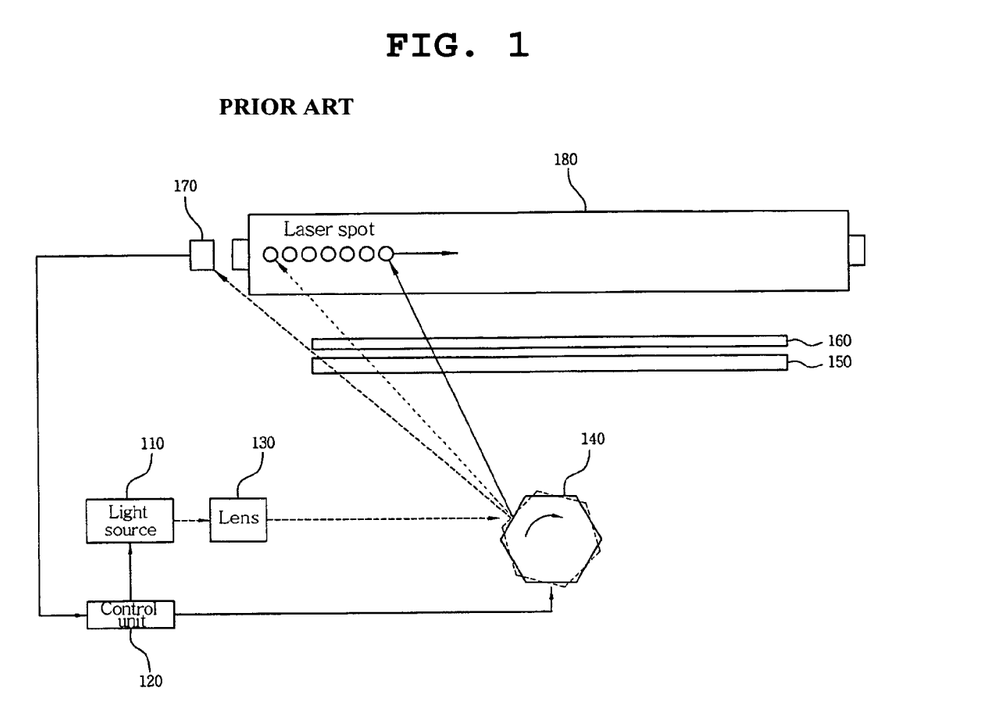
FIG. 1 is a configuration diagram of a conventional light beam scanning apparatus.

A light modulator is not necessarily applied to such a light beam scanning apparatus. For example, a conventional light beam scanning apparatus shown in FIG. 1 is not provided with a light modulator. The construction of the conventional light beam scanning apparatus is described in detail below.

Referring to FIG. 1, the conventional light beam scanning apparatus includes a light source 110, a control unit 120, a lens 130, a rotating mirror 140, an F-theta lens 150, a focusing lens 160, and a horizontal synchronization signal sensor 170.

The light source 110 may be implemented with a laser or laser diode that generates a laser beam. The light source 110 generates a laser beam while being turned on/off according to the operation control of the control unit 120.

The control unit 120 receives a timing value for beam scanning from the horizontal synchronization signal sensor 170, and controls the on/off operation of the light source 110 and the operation of the rotating mirror 140.

The lens 130 focuses a laser beam, generated by the light beam 110, toward the reflecting surface of the rotating mirror.

The rotating mirror 140 is turned on/off according to the operation control of the control unit 120, and is rotated at a preset uniform rotational velocity during operation. The rotating mirror 140 is implemented with a polygonal rotating mirror, so that it reflects an incident beam using the reflecting surface thereof while rotating. In this case, a beam reflected by a reflecting surface of the rotating mirror 140 is scanned onto a scanning object 180 while forming a beam spot arrangement with spots arranged at regular intervals. The beam spot arrangement is formed in a line along the length of the scanning object 180. Although a beam reflected by the next reflecting surface also forms a beam spot arrangement along the length of the scanning object 180, this beam spot arrangement is located below the previous beam spot arrangement while being spaced apart from the previous beam spot arrangement by a specific interval. As a result, the beam spot arrangements formed by the beams reflected by the reflecting surfaces of the rotating mirror 140 are formed along the length and circumference of the scanning object 180.

The rotating mirror 140 is equipped with a motor (not shown). The rotating mirror 140 reflects a beam, emitted through the lens 130, toward the scanning object 180 while being rotated by the motor. Such a rotating mirror may be implemented with a polygon mirror or Galvano mirror.

When the polygon mirror is employed as the rotating mirror 140, the rotating mirror 140 becomes characterized by moving a beam emitted through the lens 130 at uniform velocity.

When the Galvano mirror is employed as the rotating mirror 140 the rotating mirror 140 becomes characterized by moving a beam, emitted through the lens 130, at nonuniform velocity.

The F-theta lens 150 scans a beam, scanned by the rotating mirror 140, onto the scanning object 180 while keeping scanning velocity uniform by keeping the scanning distance between the current reflecting surface of the rotating mirror 140 and the scanning surface of the scanning object constant, thus adjusting the interval between the spots of a beam spot arrangement to a constant distance. Depending on whether the F-theta lens 150 is present, the interval between the spots of a beam spot arrangement, formed on the scanning object 180, varies. The examples are illustrated in FIGS. 2a and 2b.

Figure 2A:
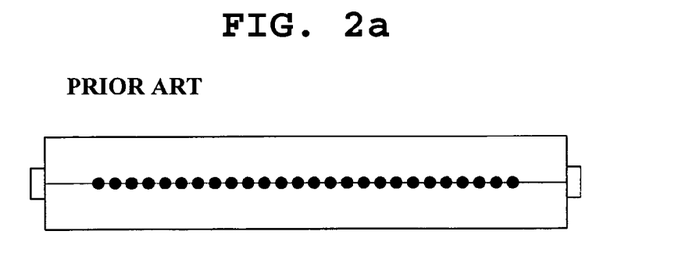
FIGS. 2a and 2b are views showing beam spot arrangements scanned by the conventional light beam scanning apparatus.

FIG. 2a shows a beam spot arrangement formed on the scanning object 180 in the case where the conventional light beam scanning apparatus is equipped with the F-theta lens 150. In this case, the beam spots are regularly arranged.

Figure 2B:
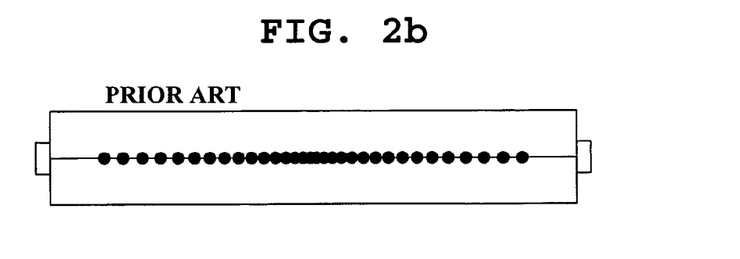

FIG. 2b shows a beam spot arrangement formed on the scanning object 180 in the case where the conventional light beam scanning apparatus is not equipped with the F-theta lens 150. In this case, the beam spots are irregularly arranged.

The focusing lens 160 focuses a beam scanned through the F-theta lens 150, and scans the beam on the scanning object 180.

The horizontal synchronization signal sensor 170 receives a reference beam spot indicating the start of printing or image display from the rotating mirror 140, sets timing for beam scanning time, which starts from the time when the reference beam spot is received, with respect to a current reflecting surface, and outputs a timing value to the control unit 120. At this time, the horizontal synchronization signal sensor 170 sets the timing for beam scanning time that extends to the time of receiving a reference beam spot reflected by the reflecting surface next to the current reflecting surface.

Though the conventional light beam scanning apparatus employs an F-theta lens to keep the interval between the beam spots of a beam spot arrangement constant on a scanning object, the F-theta lens is disadvantageous in that a long developing period is required and high manufacturing cost is incurred due to difficulty with manufacture and design.

Furthermore, a conventional light beam apparatus equipped with a light modulator keeps the interval between the beam spots of a beam spot arrangement constant using the F-theta lens. In this case, the same disadvantages are incurred because the F-theta is employed.

SUMMARY OF THE INVENTION

Accordingly, the present invention has been made keeping in mind the above problems occurring in the prior art, and an object of the present invention is to provide a method of controlling beam scanning timing and a light beam scanning apparatus using the method, which are capable of keeping the interval between the beam spots of a beam spot arrangement uniform by automatically adjusting the scanning timing of a reflected beam that will be scanned onto a scanning object.

Another object of the present invention is to provide a light beam scanning apparatus, which is capable of keeping the interval between the beam spots of a beam spot arrangement uniform by automatically adjusting the scanning timing of a reflected beam that will be scanned onto a scanning object, thus reducing manufacturing cost.

Another object of the present invention is to provide a method of controlling beam energy and a light beam scanning apparatus using the method, which is capable of making beam energy distribution uniform on the scanning surface of a scanning object by automatically adjusting the individual pixels of a light modulator.

In order to accomplish the above object, the present invention provides a light beam scanning apparatus, including a beam generation and processing means for generating a beam, converting the beam into collimated light; a calculation and control means for calculating scanning periods and beam energy for intervals between beam spots arranged on a scanning object along a scanning line, controlling the operation periods and diffraction amounts of pixels of a light modulator, which diffracts and modulates the beam emitted from the beam generation and processing means, according to the calculated scanning periods and beam energy; a diffraction and focusing means for diffracting and modulating the collimated light, which is emitted by the beam generation and processing means, according to the control of the calculation and control means on the operation periods and diffraction amounts of the pixels of the light modulator, and focusing a plurality of diffracted beams; and a scanning and processing means for scanning the plurality of beams, which are obtained by the diffraction and focusing means, while moving the plurality of diffracted beams at uniform velocity.

In addition, the present invention provides a method of controlling scanning periods in a light beam scanning apparatus, including the first step of calculating a scanning time difference $\Delta t$ between neighboring beam spots based on a program using an initial rotation angle value $\theta$ of a rotating mirror, a linear beam velocity $v$ on a scanning surface of a scanning object and an interval $\Delta x$ between beam spots arranged on the scanning surface along an x axis when the initial rotation angle value $\theta$ and the linear beam velocity $v$ are calculated and the interval $\Delta x$ is set; the second step of calculating a rotation angle value $\Delta \theta$ of the rotating mirror for the calculated scanning time difference $\Delta t$ using a uniform angular velocity $\Omega$ of the rotating mirror when the scanning time difference $\Delta t$ is calculated; the third step of updating the initial rotation angle value $\theta$ into the calculated rotation angle valve $\Delta \theta$ and calculating a new scanning time difference $\Delta t$ between beam spots using the rotation angle value $\Delta \theta$; and the fourth step of calculating and storing sampling time intervals between beam spots arranged on the scanning surface by repeating the first to third steps.

In addition, the present invention provides a method of controlling beam energy in a light beam scanning apparatus, including the first step of calculating sampling time intervals $\Delta t$ between neighboring beam spots and determining a shortest scanning time difference $\Delta tmin$ between beam spots using calculated sampling time intervals; the second step of calculating time weights R for intervals of a beam spot arrangement by dividing the shortest scanning time difference $\Delta tmin$ by the calculated sampling time intervals $\Delta t$; and the third step of determining diffraction amounts R of beams by multiplying the calculated time weights R by maximum beam energy Rmax.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 3:
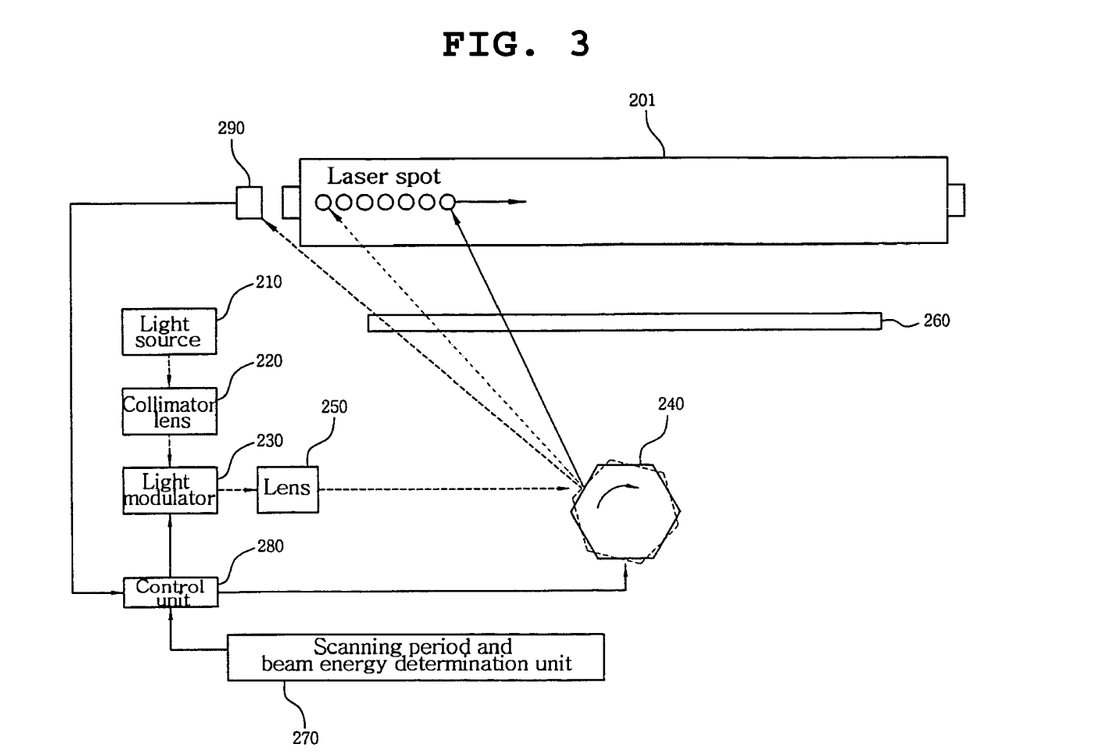
FIG. 3 is a configuration diagram of a light beam scanning apparatus using a method of controlling beam scanning timing and beam energy in accordance with an embodiment of the present invention.

FIG. 3 is a configuration diagram of a light beam scanning apparatus using beam scanning timing and beam energy in accordance with an embodiment of the present invention.

Referring to FIG. 3, the light beam scanning apparatus includes a light source 210 for generating a laser beam, at least one collimator lens 220 for converting the laser beam, emitted by the light source 210, into collimated light, a light modulator 230 for diffracting and modulating the collimated light obtained through the collimator lens 210, and outputting N (N is a natural number) beams, a rotating mirror 240 for scanning the diffracted beams, outputted by the light modulator 230, by moving the diffracted beams, at least one lens 250 for focusing the diffracted beams output by the light modulator 230, a focusing lens 260 for focusing the diffracted beams, reflected by the rotating mirror 240, onto the scanning object 201, a scanning period and beam energy determination unit 270 for determining the scanning period and beam energy of beam spots, which will be arranged on the scanning line of the scanning object 201, by calculating the scanning period and the beam energy, and a control unit 280 for controlling the operation period and diffraction amount of the pixels of the light modulator 230 according to the scanning period and beam energy of beam spots determined by the scanning period and beam energy determination unit 270.

The present invention further includes a horizontal synchronization signal sensor 290 for receiving a reference beam spot scanned onto the scanning object 201 through the focusing lens 260, setting the timing of beam scanning time starting from the time of receiving the reference beam spot, and outputting a timing value. When the light beam scanning apparatus according to the present invention is applied to a printer, the light beam scanning apparatus is equipped with the horizontal synchronization signal sensor 290.

The light source 210 may be implemented with a laser or Laser Diode (LD) that generates laser beams. The laser diode, which constitutes the light source 210, has relatively low output because it scans a plurality of beams at the same time and, thus, can provide a long scanning time, which is required for exposure, to a single pixel.

The collimated lens 220 is located between the light source 210 and the light modulator 230. When two or more collimated lenses 220 are employed, the collimated lenses 220 are arranged at regular intervals.

The light modulator 230 can simultaneously control a minimum of two pixels. The light modulator 230 can simultaneously control several hundred to several thousand pixels.

Since the light modulator 230 can control pixels in an analog fashion, it can perform Gray control when it is applied to a printer and display products. The light modulator 230 can control the size of a corresponding beam spot and the interval between beam spots by controlling an optical lens and a light projection distance.

The rotating mirror 240 is equipped with a motor (not shown), and can scan diffracted beams while being rotated by the motor. The rotating mirror 240 may be implemented with a polygon mirror or Galvano mirror.

When the polygon mirror is used as the rotating mirror 240, the rotating mirror 240 becomes characterized by moving diffracted beams, output from the light modulator, at uniform linear velocity. At this time, the focusing lens 260 deflects the diffracted beams, reflected by the polygon mirror in a main scanning direction, by focusing the diffracted beams.

When the Galvano mirror is employed as the rotating mirror 240, the rotating mirror 240 becomes characterized by moving the diffracted beams, output from the light modulator 230, at nonuniform linear velocity. At this time, the focusing lens 260 deflects the diffracted beams, reflected by the Galvano mirror, by focusing the diffracted beams.

The lens 250 is located between the light modulator 230 and the rotating mirror 240. When two or more lenses 250 are arranged, the lenses 250 are arranged at regular intervals.

The rotating mirror 240 is turned on/off according to the operation control of the control unit 290, and is rotated at preset uniform rotational velocity during operation. The rotating mirror 240 is formed in a polygonal shape, and reflects incident light using the reflecting surfaces thereof while being rotated. In this case, the beams reflected by a reflecting surface of the rotating mirror 240 are scanned onto the scanning object 201 while forming a beam spot arrangement with spots arranged at regular intervals. The beam spot arrangement is formed in a line along the length of the scanning object 201. Although a beam reflected by the next reflecting surface also forms a beam spot arrangement along the length of the scanning object 201, this beam spot arrangement is located below the previous beam spot arrangement while being spaced apart from the previous beam spot arrangement by a specific interval. As a result, the beam spot arrangements formed by the beams reflected by the reflecting surfaces of the rotating mirror 240 are formed along the length and circumference of the scanning object 201.

The horizontal synchronization signal sensor 290 receives a reference beam spot indicating the start of printing or image display from the rotating mirror 240, sets timing for beam scanning time, which starts from the time when the reference beam spot is received, with respect to a current reflecting surface, and outputs a timing value to the control unit 280. At this time, the horizontal synchronization signal sensor 290 sets the timing for the beam scanning time that extends to the time of receiving a reference beam spot reflected by a reflecting surface next to the current reflecting surface of the rotating mirror 240, and outputs the timing value to the control unit 280.

When the timing value for a current horizontal scanning line calculated by the horizontal synchronization signal sensor 290 is input to the control unit 280, the control unit 280 causes beam spots to be scanned onto the current horizontal scanning line of the scanning object 201 by operating the light modulator 230 for the time value.

If a reference beam spot for a horizontal scanning line immediately below the current horizontal scanning line is not received by the horizontal synchronization signal sensor 270 after the beam scanning time for the current horizontal scanning line, which corresponds to the timing value calculated by the horizontal synchronization signal sensor 270, has elapsed, the horizontal synchronization signal sensor 270 does not set timing for beam scanning time with respect to a new scanning line. Accordingly, a timing value for new horizontal beam scanning is not input to the control unit 290. As a result, the control unit 290 stops the operation of the light modulator 230.

Figure 4:
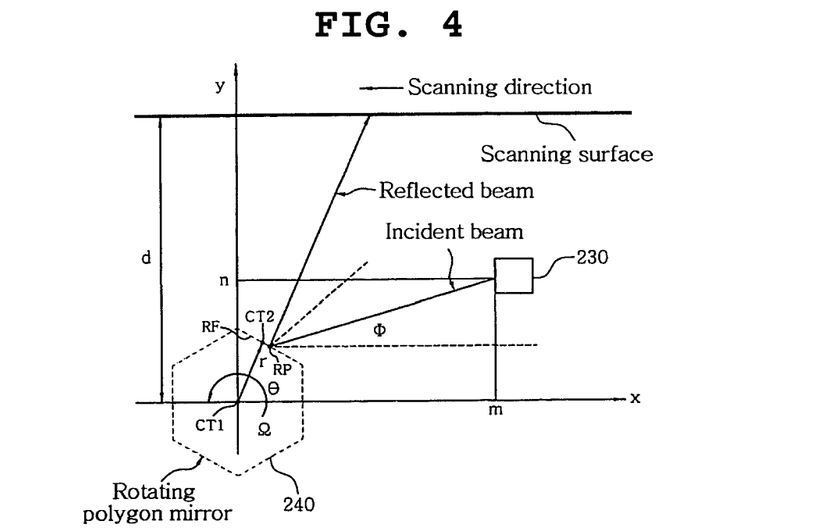
FIG. 4 is a diagram illustrating an example of the calculation process of a beam scanning period and beam energy determination unit.

FIG. 4 is a diagram illustrating the calculation process of the beam scanning period and beam energy determination unit provided in the light beam scanning apparatus according to the present invention. The process of calculating a beam scanning period and beam energy is described in detail with reference to FIG. 4.

The variables of the following equation are defined as described below.

Referring to FIG. 4, "x" is a horizontal axis that horizontally passes through the rotation axis CT1 of the rotating mirror 240, "y" is a vertical axis that vertically passes through the rotation axis CT1 of the rotating mirror 240, "r" is a distance that extends from the rotation axis CT1 of the rotating mirror 240 to the center of a reflecting surface RF, "θ" is an angle that a straight line forms with the x axis in the case where the rotation axis of the rotating mirror CT1 is connected to the center CT2 of the reflecting surface RF by the straight line, "d" is the rectilinear distance between the x axis and the scanning surface of the scanning object 201, "Ω" is the uniform angular velocity of the rotating mirror 240, "n" is a coordinate point on the y axis that is a coordinate value existing on the same horizontal line as the light emitting point of the light modulator 230, "φ" is an angle that a horizontal line horizontally passing through the reflecting point RP of the rotating mirror 240 forms with a beam incident from the light modulator 230 in the case where the beam incident from the light modulator 230 is reflected at the reflecting point RP, and "m" is a coordinate point on the x axis that is a coordinate value existing on the same vertical line as the light emitting point of the light modulator 230.

The plane equation of beam scanning on the current reflecting surface RF of the rotating mirror 240 is expressed as the following Equations 1 and 2.

$$F1(x, y, r, \theta)=0 \quad (1)$$

$$x \cos \theta + y \sin \theta = r \quad (2)$$

The rectilinear equation of a beam incident from the light modulator 230 to the reflecting point RP of the rotating mirror 240 is expressed as the following Equations 3 and 4.

$$F2(x, y, n, m, \phi)=0 \quad (3)$$

$$y=\tan \phi x + n - m \tan \phi \quad (4)$$

The rectilinear equation of a beam reflected from the reflecting point RP of the current reflecting surface RF of the rotating mirror 240 is expressed as the following Equations 5 and 6.

$$F3(x, y, n, r, \phi)=0 \quad (5)$$

$$x=(r-n \sin \theta)/\cos \theta + (y-n)\cot 2\theta \quad (6)$$

When a beam reflected from the current reflecting surface RF of the rotating mirror 240 is scanned onto the scanning object 201, the trace of a beam on a scanning surface is expressed as the following Equations 7 and 8.

$$x=F4(n, m, r, d, \theta, \phi) \quad (7)$$

$$x=(r-n \sin \theta)/\cos \theta + (d-n)\cot 2\theta \quad (8)$$

Since a beam, which the rotating mirror 240 reflects using the reflecting surface thereof while being rotated, is scanned onto the scanning object 201, the beam scanned onto a scanning surface in an x direction has linear velocity. The linear velocity v of the beam on the scanning surface is expressed as the following Equation 9.

$$v=dF4/dt=dF4/d\theta*d\theta/dt=dF4/d\theta*\Omega \quad (9)$$

where dθ/dt is the uniform angular velocity Ω of the rotating mirror.

Since the linear velocity v of a beam scanned onto the scanning surface of the scanning object 201 varies as represented by the above Equations, the interval between the beam spots is not uniform. In the conventional beam scanning apparatus, the nonuniformity of the interval occurring between the beam spots due to the variation of the linear velocity of beams is overcome using an F-theta lens.

However, the F-theta requires a long manufacturing period and expensive manufacturing cost, so that the present invention does not employ the F-theta lens, but makes the interval between beam spots uniform using the following scheme.

Figure 5:
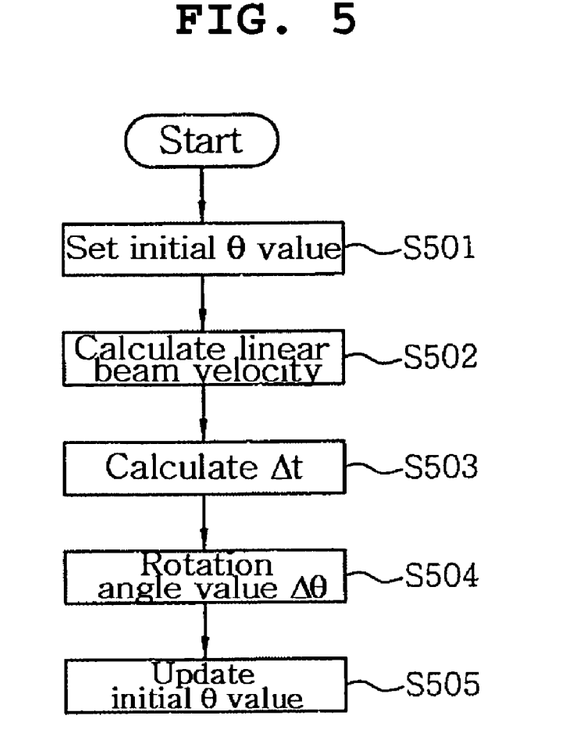
FIG. 5 is a flowchart showing the process of calculating beam scanning timing in a light beam scanning apparatus in accordance with the present invention.

FIG. 5 is a flowchart showing the process of calculating beam scanning timing in a light beam scanning apparatus in accordance with the present invention.

A manufacturer sets an initial θ vale at step S501. Thereafter, the manufacturer calculates the linear velocity v of a beam on the scanning surface by substituting the initial θ value for the corresponding variable of Equation 9 at step S502.

When the initial θ value and the linear velocity v of the beam on the scanning surface are obtained as described above and the interval Δx between beam spots arranged on the scanning surface along the x axis is determined by the manufacturer, the scanning period and beam energy determination unit 270 calculates the scanning time difference Δt between neighboring beam spots by executing Equations 10 and 11 according to a predetermined program at step S503. In this case, Δx is the x axis coordinate distance between neighboring beam spots, and Δt is a sampling time interval that allows a beam scanned onto the scanning surface to have uniform linear velocity.

$$\Delta x=dx/d\theta*d\theta/dt*\Delta t \quad (10)$$

where dx/dθ is the derivative of x with respect to θ, and dθ/dt is the derivative of θ with respect to t.

$$\Delta t=\Delta x/\Omega*1/v \quad (11)$$

where 1/v is expressed as the following Equation 12.

$$1/v=d\theta/dx \quad (12)$$

When the scanning time difference Δt between the neighboring spots is calculated through the above process, the scanning period and beam energy determination unit 270 calculates the rotation angle amount Δθ of the rotating mirror 240 for the calculated Δt using the uniform angular velocity Ω of the rotating mirror 240 at step S504.

When the rotation angle amount Δθ is calculated, the scanning period and beam energy unit 270 updates the set initial θ value at step S505, and calculates the new scanning time difference Δt between beam spots by substituting the updated rotation angle amount Δθ for the corresponding variable of Equations 10 and 11.

By repeating the above-described process, the scanning period and beam energy determination unit 270 calculates the sampling time interval Δt that allows the beam scanned onto the scanning surface of the scanning object 201 to have uniform linear velocity.

The sampling time interval Δt calculated as described above varies with the interval between the beam spots of a beam spot arrangement on the scanning surface. The variation of the sampling time period Δt depending on the interval between the beam spots of a beam spot arrangement is shown in FIG. 6.

Figure 6:
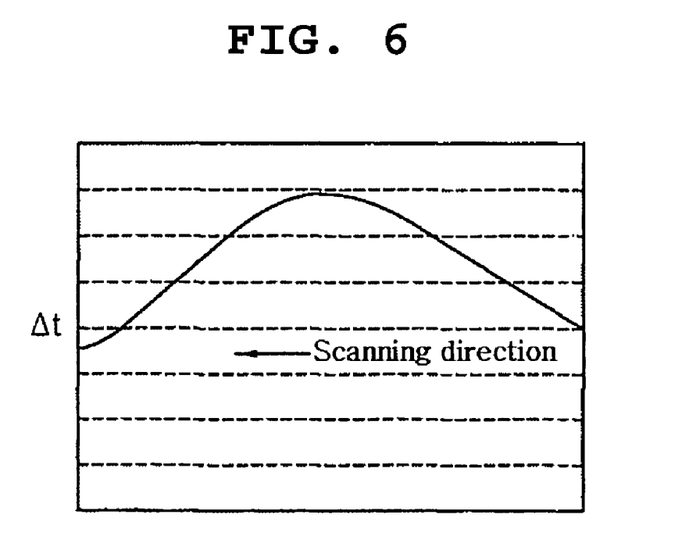
FIG. 6 is a graph showing the operation periods of the pixels of a light modulator applied to the light beam scanning apparatus of the present invention.

As shown in FIG. 6, the sampling time interval Δt gradually increases in the range from a reference beam spot that is the start point of beam scanning to a central beam spot, and gradually decreases in the range from the central beam spot to a final beam spot.

The reason why the sampling time interval Δt is determined to have time-variation is that, in the case where an F-theta lens is not employed, the interval Δt between beam spots gradually decreases in the range from the reference beam spot to the central beam spot while the interval Δt between beam spots gradually increases in the range from the central beam spot to the final beam spot, as shown in FIG. 2b. Accordingly, in accordance with the present invention, the intervals between beam spots ranging from the reference beam spot to the final beam spot are made uniform although the F-theta lens is not employed.

When the scanning period and beam energy determination unit 270 calculates and stores the sampling time interval Δt as described above, the control unit 280 retrieves and stores the sampling time interval Δt. When a beam is scanned onto the scanning object 201 under this condition, the control unit 280 operates the pixels of the light modulator 230 according to the stored sampling time interval Δt.

For example, if the control unit 280 controls the pixel operation of the light modulator 230 so that the operation time interval Δt between pixels for diffracting a beam spot, which is scanned onto a location near the first beam spot of a beam spot arrangement on the scanning surface, becomes 0.1 second, the control unit 280 controls the pixel operation of the light modulator 230 so that the operation time interval Δt between pixels for diffracting a beam spot, which is scanned onto a location near the central beam spot of the beam spot arrangement on the scanning surface, becomes 1 second. Furthermore, the control unit 280 controls the pixel operation of the light modulator 230 so that the operation time interval Δt between pixels for diffracting a beam spot, which is scanned onto a location near the final beam spot of the beam spot arrangement on the scanning surface, becomes 0.1 second.

When the pixels are controlled as described above, the operation time interval Δt between pixels for diffracting a beam spot, which is scanned onto a location near the central beam spot of the beam spot arrangement on the scanning surface, gradually increases from 0.1 second to 1 second in the range from the first pixel of the beam spot arrangement to the central pixel, while the operation time interval Δt gradually decreases from 1 second to 0.1 second in the range from the central spot of the beam spot arrangement to the final beam spot.

However, when the operation time interval between the pixels of the light modulator 230 is controlled to be different, the scanning time of a beam spot, which is scanned onto the scanning surface of the scanning object, varies, so that a printer or image display is problematic in that printing density and resolution vary.

With a printer taken as an example, the scanning time of a specific beam spot increases in proportion to the scanning time difference Δt between beam spots on the scanning surface, so that the beam energy of the scanned beam spot increases, thus increasing the printing density on the part of the scanning surface. That is, the beam energy of a beam spot is inversely proportional to the scanning time of the beam spot, so that the printing density on the corresponding part of the scanning surface decreases relatively.

In order to solve the above-described problem, the present invention controls beam energy according the scanning time difference Δt between beam spots on a scanning surface as described below.

Figure 7:
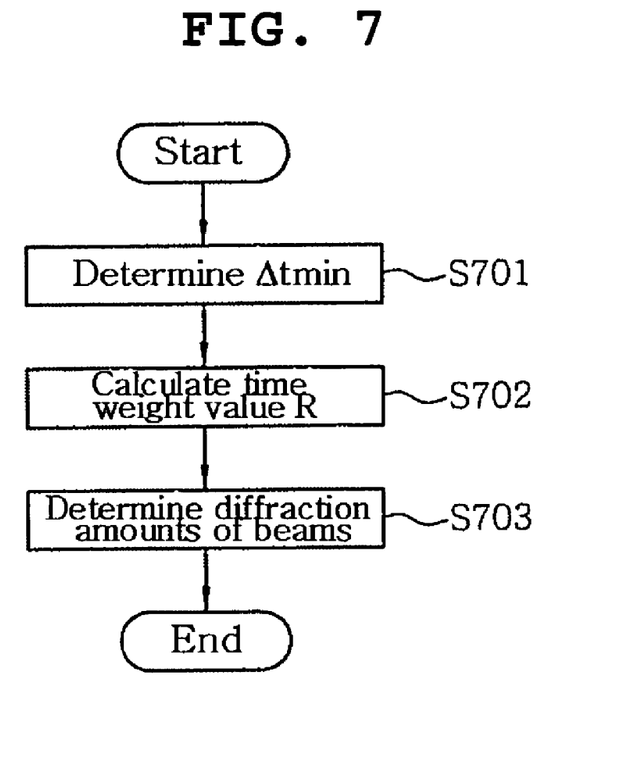
FIG. 7 is a flowchart showing a process of calculating beam energy in a light beam scanning apparatus in accordance with the present invention.

FIG. 7 is a flowchart showing a process of calculating beam energy in a light beam scanning apparatus in accordance with the present invention.

Referring to FIG. 7, the scanning period and beam energy determination unit 270 determines the shortest one Δtmin of all calculated scanning time differences Δt by executing Equation 11 at step S701.

$$R = \Delta tmin / \Delta t \tag{13}$$

Thereafter, the scanning period and beam energy determination unit 270 determines the diffraction amounts of beams, which form beam spots on the scanning surface, by multiplying the maximum beam energy Rmax by weights for the intervals of the beam spots at step S703.

$$P = R * Pmax \tag{14}$$

where Pmax is the maximum output value of the light source.

When the diffraction amounts of beams, which will be scanned onto the scanning surface, are calculated as described above, the scanning period and beam energy determination unit 270 stores the calculated diffraction amounts P, and the control unit 280 reads and store the diffraction amounts P. When a beam is scanned onto the scanning object 201 under this condition, the control unit 280 controls the diffraction amounts of the pixels of the light modulator according to the stored diffraction amounts P. In this case, the amount of the pixels of the light modulator 230 is maximized when the height difference between the pixels is λ/4. As the height difference decreases from λ/4, the diffraction amount of the pixels decreases.

Since the height difference between the pixels increase or decreases in proportion to the amount of driving voltage, the control unit 280 controls the amount of voltage, which will be applied to a pixel, according to the stored diffraction amounts P.

For example, since the first beam spot of the beam spot arrangement is scanned for a relatively short time, the control unit 280 applies high voltage so that the diffraction amount of a corresponding pixel is maximized. In contrast, since the central beam spot of the beam spot arrangement is scanned for a relatively long time, the control unit 280 applies low voltage so that the diffraction amount of a corresponding pixel is minimized.

Figure 8:
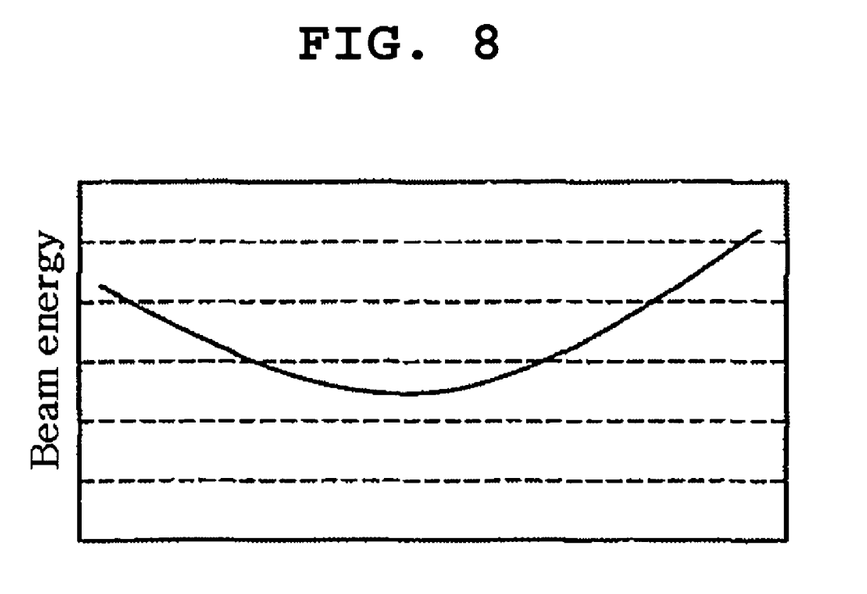
FIG. 8 is a graph showing the diffraction amounts of the pixels of the light modulator applied to the light beam scanning apparatus of the present invention.

The variation in the diffraction amount of the pixels of the light modulator 230, which is controlled through the above-described process, is shown in FIG. 8.

As shown in FIG. 8, since the first and last beam spots of the beam spot arrangement are scanned for a relatively long time, the diffraction amount of a corresponding pixel increases. In contrast, when a central beam spot is scanned for a long scanning time, the diffraction amount of the corresponding pixel decreases.

Figure 9:
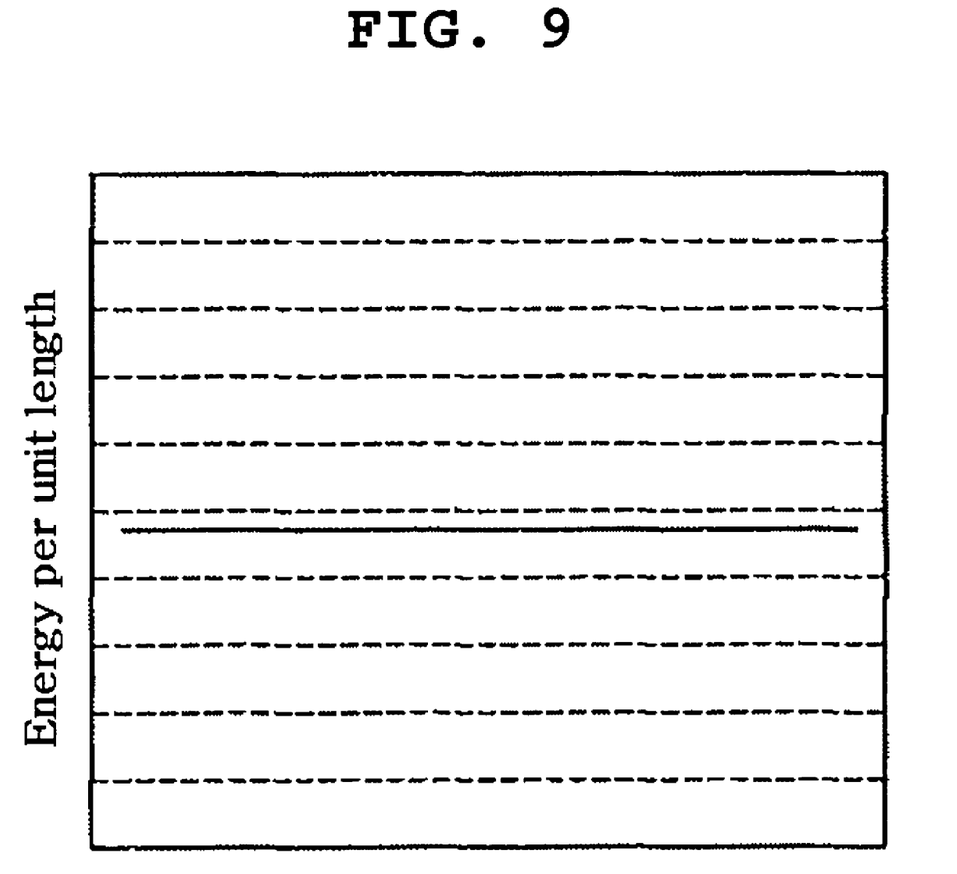
FIG. 9 is a graph showing the distribution of beam energy scanned by the light beam scanning apparatus of the present invention.

The control unit 180 makes beam energy, which will be scanned onto the scanning surface, uniform by controlling the diffraction amounts of pixels, as shown in FIG. 9.

As described above, the present invention provides a method of controlling beam scanning timing and beam energy and the light beam scanning apparatus using the same, which keeps the interval between beam spots uniform and makes beam energy distribution uniform through the automatic control of beam scanning timing and beam energy, thus simplifying the manufacture of the light beam scanning apparatus and reducing the manufacturing costs of the light beam scanning apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A light beam scanning apparatus, comprising:
   beam generation and processing means for generating a beam and converting the beam into collimated light;
   calculation and control means for calculating scanning periods and beam energy for intervals between beam spots arranged on a scanning object along a scanning line, controlling operation periods and diffraction amounts of pixels of a light modulator, which diffracts and modulates the beam emitted from the beam generation and processing means, according to the calculated scanning periods and beam energy;
   diffraction and focusing means for diffracting and modulating the collimated light, which is emitted by the beam generation and processing means, according to control of the calculation and control means on the operation periods and diffraction amounts of the pixels of the light modulator, and focusing a plurality of diffracted beams; and scanning and processing means for scanning the plurality of beams, which are obtained by the diffraction and focusing means, while moving the plurality of diffracted beams at uniform velocity.

2. The light beam scanning apparatus as set forth in claim 1, wherein the scanning and processing means comprises:

a rotating mirror for moving the plurality of diffracted beams, which are diffracted and reflected by the light modulator, at uniform velocity and reflecting the plurality of beams; and a focusing lens for focusing the plurality of diffracted beams, which are reflected by the rotating mirror, on the scanning object.

3. The light beam scanning apparatus as set forth in claim 2, wherein the rotating mirror is a polygon mirror that is rotated by a motor.

4. The light beam scanmng apparatus as set forth in claim 3, wherein the polygon mirror moves and scans the plurality of diffracted beams that are output from the diffraction and scanning means.

5. The light beam scanning apparatus as set forth in claim 1, wherein the beam generation and processing means comprises:

a light source for generating the laser beam; and at least one collimator lens for converting the laser beam, which is generated by the light source, into the collimated light.

6. The light beam scanning apparatus as set forth in claim 5, wherein the scanning and processing means comprises:

a rotating mirror for moving the plurality of diffracted beams, which are diffracted and reflected by the light modulator, at uniform velocity and reflecting the plurality of beams; and a focusing lens for focusing the plurality of diffracted beams, which are reflected by the rotating mirror, on the scanning object.

7. The light beam scanning apparatus as set forth in claim 6, wherein the rotating mirror is a polygon mirror that is rotated by a motor.

8. The light beam scanmng apparatus as set forth in claim 7, wherein the polygon mirror moves and scans the plurality of diffracted beams that are output from the diffraction and scanning means.

9. The light beam scanning apparatus as set forth in claim 1, wherein the calculation and control means comprises:

a scanning period and beam energy determination unit for calculating the scanning periods and beam energy for the intervals between beams spots formed on the scanning line of the scanning object; and a control unit for controlling the operation periods and diffraction amounts of the pixels of the light modulator according to the scanning periods and beam energy calculated by the scanning period and beam energy determination unit.

10. The light beam scanning apparatus as set forth in claim 9, wherein the scanning and processing means comprises:

a rotating mirror for moving the plurality of diffracted beams, which are diffracted and reflected by the light modulator, at uniform velocity and reflecting the plurality of beams; and a focusing lens for focusing the plurality of diffracted beams, which are reflected by the rotating mirror, on the scanning object.

11. The light beam scanning apparatus as set forth in claim 10, wherein the rotating mirror is a polygon mirror that is rotated by a motor.

12. The light beam scanning apparatus as set forth in claim 10, wherein the polygon mirror moves and scans the plurality of diffracted beams that are output from the diffraction and scanning means.

13. The light beam scanning apparatus as set forth in claim 1, wherein the diffraction and focusing means comprises:

the light modulator for diffracting and modulating the collimated light, according to the operation periods and diffraction control of the calculation and control means, and outputting the plurality of diffracted beams; and at least one lens for focusing the plurality of diffracted beams, which are diffracted, modulated and output by the light modulator, on a current deflecting surface of the scanning and processing means.

14. The light beam scanning apparatus as set forth in claim 13, wherein the scanning and processing means comprises:

a rotating mirror for moving the plurality of diffracted beams, which are diffracted and reflected by the light modulator, at uniform velocity and reflecting the plurality of beams; and a focusing lens for focusing the plurality of diffracted beams, which are reflected by the rotating mirror, on the scanning object.

15. The light beam scanning apparatus as set forth in claim 14, wherein the rotating mirror is a polygon mirror that is rotated by a motor.

16. The light beam scanning apparatus as set forth in claim 14, wherein the polygon mirror moves and scans the plurality of diffracted beams that are output from the diffraction and scanning means.

17. A method of controlling scanning periods in a light beam scanning apparatus, comprising:

the first step of calculating a scanning time difference $\Delta t$ between neighboring beam spots based on a program using an initial rotation angle value $\theta$ of a rotating mirror, a linear beam velocity v on a scanning surface of a scanning object and an interval $\Delta x$ between beam spots arranged on the scanning surface along an x axis when the initial rotation angle value $\theta$ and the linear beam velocity v are calculated and the interval $\Delta x$ is set;

the second step of calculating a rotation angle value $\Delta\theta$ of the rotating mirror for the calculated scanning time difference $\Delta t$ using a uniform angular velocity $\Omega$ of the rotating mirror when the scanning time difference $\Delta t$ is calculated;

the third step of updating the initial rotation angle value $\theta$ into the calculated rotation angle valve $\Delta\theta$ and calculating a new scanning time difference $\Delta t$ between beam spots using the rotation angle value $\Delta\theta$; and the fourth step of calculating and storing sampling time intervals between beam spots arranged on the scanning surface by repeating the first to third steps.

18. The method as set forth in claim 17, wherein operation periods of pixels of a light modulator are controlled according to the calculated sampling time intervals between beam spots.

19. The method as set forth in claim 17, wherein the scanning time differences Δt between beam spots are calculated using the following equation, $$\Delta t = \Delta x/\Omega * 1/v.$$

20. The method as set forth in claim 19, wherein operation periods of pixels of a light modulator are controlled according to the calculated sampling time intervals between beam spots.

21. A method of controlling beam energy in a light beam scanning apparatus, comprising:

the first step of calculating sampling time intervals Δt between neighboring beam spots and determining a shortest scanning time difference Δtmin between beam spots using calculated sampling time intervals;

the second step of calculating time weights R for intervals of a beam spot arrangement by dividing the shortest scanning time difference Δtmin by the calculated sampling time intervals Δt; and the third step of determining diffraction amounts R of beams by multiplying the calculated time weights R by maximum beam energy Rmax.

22. The method as set forth in claim 21, wherein height differences between pixels of a light modulator are controlled according to the determined diffraction amounts of beams.

* * * * *